US006529493B1

(12) United States Patent
Varin

(10) Patent No.: US 6,529,493 B1
(45) Date of Patent: Mar. 4, 2003

(54) MOBILE STATION COMBINING TELECOMMUNICATIONS AND POSITIONING FUNCTIONS, AND A CORRESPONDING METHOD OF RECEIVING POSITIONING SIGNALS BY A MOBILE STATION

(75) Inventor: Joël Varin, Osny (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/057,513

(22) Filed: Apr. 9, 1998

(30) Foreign Application Priority Data

Apr. 10, 1997 (FR) ............................. 97 04402

(51) Int. Cl.⁷ ..................... H04B 7/185; H04B 7/212
(52) U.S. Cl. ................... 370/337; 370/347; 342/357.12
(58) Field of Search ................... 370/337, 339, 370/341, 345, 347, 348, 314, 321, 376, 377, 522, 528, 529; 455/440, 456; 342/357.01–357.17

(56) References Cited

U.S. PATENT DOCUMENTS

| 4,777,655 | A | * | 10/1988 | Numata et al. ............... 455/76 |
| 5,119,504 | A | * | 6/1992 | Durboraw, III ............ 455/54.1 |
| 5,301,368 | A | | 4/1994 | Hirata |
| 5,471,471 | A | * | 11/1995 | Freeburg et al. ............... 370/79 |
| 5,614,914 | A | * | 3/1997 | Bolgiano et al. ........... 342/364 |
| 5,625,363 | A | * | 4/1997 | Spilker ........................ 342/352 |
| 5,712,899 | A | * | 1/1998 | Pace, II ........................ 379/58 |
| 5,913,170 | A | * | 6/1999 | Wortham ..................... 455/457 |

FOREIGN PATENT DOCUMENTS

| EP | 0 748 727 A1 | 12/1996 |
| EP | 0 748 8081 A1 | 12/1996 |
| WO | WO 94/12892 | 6/1994 |
| WO | WO 97/14056 | 4/1997 |

* cited by examiner

*Primary Examiner*—Alpus H. Hsu
*Assistant Examiner*—Toan Nguyen
(74) *Attorney, Agent, or Firm*—Sughrue Mion, PLLC

(57) ABSTRACT

The invention relates to a mobile station of a digital cellular communications system, the station being of the type comprising:
   means for transmitting and receiving telecommunications signals by radio, in time division multiple access mode;
   means for receiving positioning signals transmitted by a positioning system; and
   processor means for processing said telecommunications signals and said positioning signals.

According to the invention, said processor means are continuously connected to said means for transmitting and receiving telecommunications signals and to said means for receiving positioning signals, said processor means making use of received positioning signals during moments in which said telecommunications signals are not being transmitted and are not being received.

23 Claims, 2 Drawing Sheets

MOBILE STATION COMBINING TELECOMMUNICATIONS AND POSITIONING FUNCTIONS, AND A CORRESPONDING METHOD OF RECEIVING POSITIONING SIGNALS BY A MOBILE STATION

The field of the invention is that of determining the geographical position of a mobile station in a digital cellular communications system of the type operating in time division multiple access (TDMA) mode.

BACKGROUND OF THE INVENTION

The digital cellular communications system to which the mobile station discussed herein belongs may be of the following types: Global System for Mobile communication (GSM); or personal Communications Network (PCN); or digital European cordless telecommunication (DECT).

It is recalled that a mobile station is the physical equipment used by a user of a digital cellular communications system to access the telecommunications services on offer. In general, there are three types of mobile station, namely: vehicle-mounted stations, portable stations, and hand-held terminals.

More precisely, the invention relates to a mobile station combining telecommunications and positioning functions.

The invention has numerous applications, such as locating stolen mobile stations (and simultaneously locating stolen vehicles in the event that the mobile stations are fixed to the vehicles), for example.

More generally, the invention can be applied in all cases where it is desired to determine the geographical position of a mobile station at a given instant.

In the description below, the state of the art is described essentially in terms of known hand-held terminals. It is clear that this discussion can be generalized to any type of mobile station. The present invention is applicable to any type of mobile station, and not only to a hand-held terminal.

In the state of the art, several techniques are known that enable telecommunications and positioning functions to be combined in a hand-held terminal.

A first known technique consists in combining two independent terminals in a single housing, specifically a radio telecommunications terminal (e.g. a GSM terminal) and a positioning terminal (e.g. a GPS terminal), and in interconnecting them by means of a data line. Under such circumstances, it has also been proposed to use the telecommunications terminal to transmit the positioning information to an operating center. In other words, positioning information is transmitted over the radio telecommunications network (e.g. via control channels or using a short message service).

Conventionally, a positioning terminal receives positioning signals transmitted from one or more reference points. In particular, the Global Positioning System (GPS) is known which implements a constellation of 24 satellites distributed in such a manner that at any given point it is always possible to receive signals transmitted from three separate satellites. A GPS type positioning terminal can determine its own position from the positioning signals it receives from three separate satellites.

The major drawback of that first known technique is to be significantly more expensive than an ordinary telecommunications terminal. The positioning terminal has receiver means and processor means (generally operating in baseband) and so does a telecommunications terminal.

A second known technique sets out to remedy that drawback, but does not fully achieve its objective. That technique consists in using a common baseband processing unit either with a system for receiving positioning signals (operation in positioning mode) or else with a transceiver system for telecommunications signals (operation in telecommunications mode). The terminal includes switching means enabling one or other of its two operating modes to be selected (positioning or telecommunications).

Thus, compared with the first known technique, there is a saving of one baseband processor unit. Unfortunately, that second known technique suffers from the major drawback of not being able to operate simultaneously both for positioning and for telecommunications.

OBJECTS AND SUMMARY OF THE INVENTION

A particular object of the invention is to mitigate those various drawbacks of the prior art.

More precisely, one of the objects of the present invention is to provide a mobile station combining telecommunications and positioning functions, and which is of small extra cost compared with a mobile station that performs the telecommunications function only.

The invention also seeks to provide such a mobile station that is capable of operating simultaneously for positioning and for telecommunications purposes.

Another object of the invention is to provide such a mobile station that enables positioning information to be transmitted to an operating center, while simultaneously performing voice and/or data communication.

These objects, and others that appear below, are achieved according to the invention by means of a mobile station of a digital cellular communications system, the station being of the type comprising:

means for transmitting and receiving telecommunications signals by radio in time division multiple access mode;

means for receiving positioning signals transmitted by a positioning system; and processor means for processing said telecommunications signals and said positioning signals;

wherein said processor means are continuously connected to said means for transmitting and receiving telecommunications signals and to said means for receiving positioning signals, said processor means making use of received positioning signals during moments in which said telecommunications signals are not being transmitted and are not being received.

The principle of the invention thus consists in taking advantage of the moments of inactivity of the means for transmitting and receiving telecommunications signals in order to perform positioning measurements. Thus, the mobile station of the invention can operate simultaneously both for positioning and for telecommunications purposes. It should be emphasized that such moments of radio inactivity in a telecommunications system are always present in a digital cellular communications system of the type operating in time division multiple access (TDMA) mode.

It will be observed that the invention requires only one processor unit, without that requiring switching between two operating modes (positioning and telecommunications). The processor unit receives positioning signals continuously, but only some of them are used, i.e. at least some of those which are received during moments when radio telecommunications signals are not being transmitted and are not being received. It is recalled that in TDMA mode, each mobile station has such moments assigned to it, corresponding to the spectrum being segmented in time, both in the up direction (mobile station to base station) and in the down direction (base station to mobile station).

In a preferred embodiment of the invention, said telecommunications signals are structured for transmission and for reception in successive frames, each transmission frame and each reception frame including at least one time slot for transmission or for reception of telecommunication signals by said mobile station, and the positioning signals used by the processor means are received during unused time slots, i.e. time slots that correspond neither to a transmission time slot nor to a reception time slot for the telecommunications signals.

Advantageously, said mobile station includes single receiver means common both to said telecommunications signals and to said positioning signals.

This saves one receiver. However the single receiver used must generally be a multiband receiver so as to be capable of receiving both telecommunications signals and positioning signals.

Advantageously, said processor means include means for extracting positioning data contained in said positioning signals that are used, and for inserting said positioning data, optionally after transforming it, into telecommunications signals transmitted by said transmission means to an operating center.

In this way, the telecommunications network is used for relaying positioning data to an operating center.

Preferably, said positioning data is transmitted to said operating center via at least one control channel and/or via a short message service.

Preferably, said positioning system is of the type comprising a constellation of satellites transmitting said positioning signals.

Advantageously, said digital cellular communications system belongs to the group comprising GSM type systems and PCN and DECT type systems.

The invention also provides a method of receiving positioning signals by a mobile station of a digital cellular communications system, said mobile station being of the type that transmits and receives telecommunications signals in a time division multiple access mode, the method including a step of making use of positioning signals received during moments when said telecommunications signals are not being transmitted and are not being received.

BRIEF DESCRIPTION OF THE DRAWING

Other characteristics and advantages of the invention appear on reading the following description of a preferred embodiment of the invention given by way of non-limiting example, and with reference to the accompanying drawing, in which.

MORE DETAILED DESCRIPTION

The invention thus relates to a mobile station combining positioning and radio telecommunications functions. It is recalled that the digital cellular communications system to which the mobile station belongs necessarily operates in time division multiple access (TDMA) mode.

In the description below, consideration is given to the specific case of a GSM type digital cellular communications system together with a GPS type positioning system. Nevertheless, it is clear that the invention can be applied to other types of digital cellular communications system and to other types of positioning system.

Figure 1:
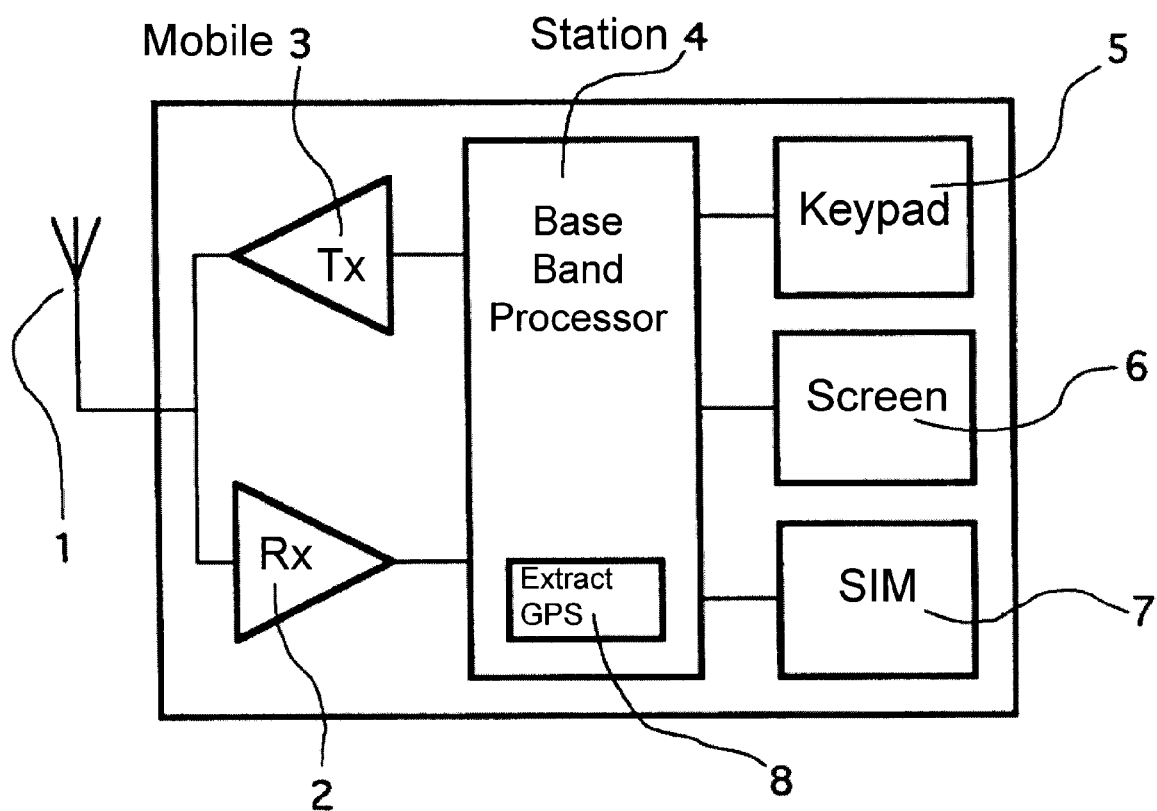
FIG. 1 is a block diagram of a particular embodiment of a mobile station of the invention.

In the particular embodiment shown in FIG. 1, the mobile station of the invention comprises, in particular:

an antenna 1;

a single broadband radio receiver 2 (a dual frequency GSM/GPS receiver) enabling both telecommunications signals (GSM signals) and positioning signals (GPS signals) to be received;

a radio transmitter 3 enabling telecommunications signals to be transmitted (for transmitting GSM signals);

means 4 (generally built around a processor) for baseband processing both of telecommunications signals and of positioning signals;

a keypad 5;

a screen 6; and a subserver identification module (or SIM card) 7.

In accordance with the invention, the processor means 4 are connected permanently to the broadband receiver 2 and to the transmitter 3. It makes use of the positioning signals received during moments when telecommunications signals are neither being transmitted nor being received. In conventional manner, in TDMA mode, each mobile station transmits and receives telecommunications signals solely during predetermined time intervals. There therefore exist moments in which the processor means 4 is inactive from the telecommunications point of view, and those moments are taken advantage of for making use of positioning signals.

Figure 2:
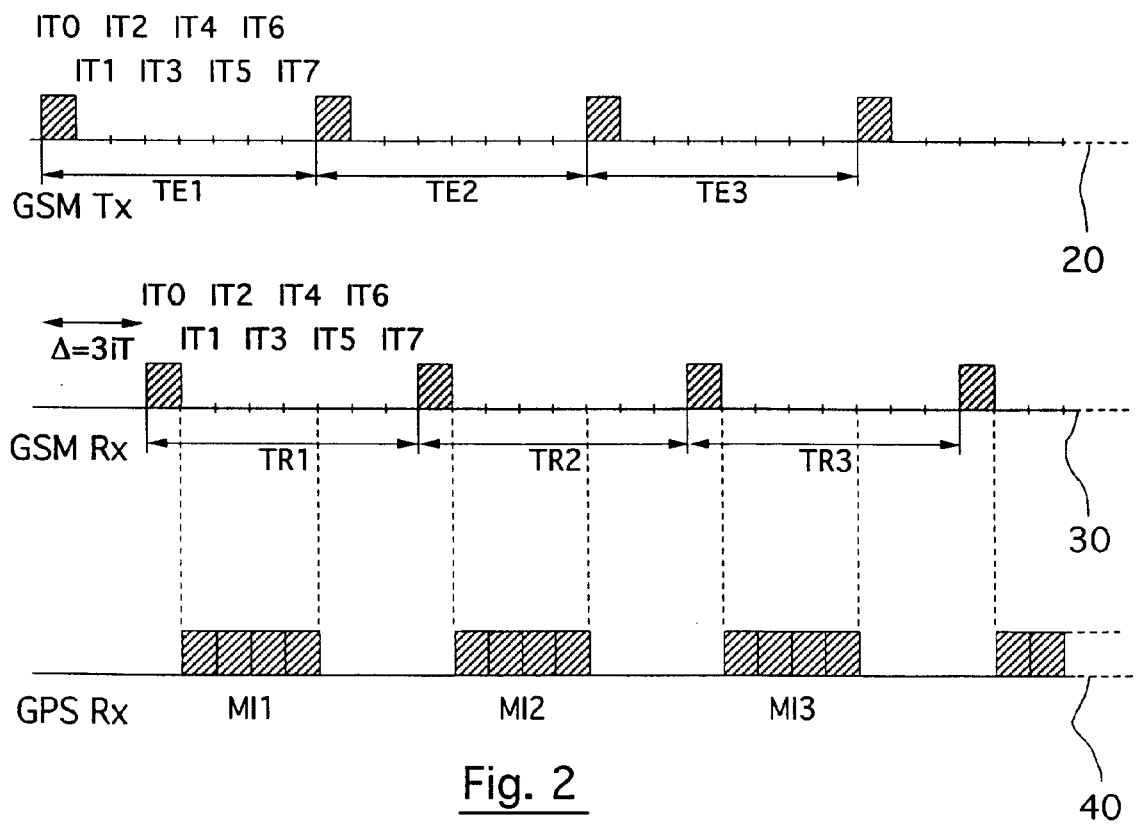
FIG. 2 is an example for explaining the moments during which positioning signals are used, corresponding to moments during which radio telecommunications signals are neither being transmitted nor being received.

FIG. 2 is an example for explaining the moments during which positioning signals are used, corresponding to moments during which radio telecommunications signals are neither being transmitted nor being received.

The moments during which telecommunications signals are being transmitted on the up path (mobile station to base station) are marked on the first line 20 of FIG. 2 (GSM Tx). The moments during which telecommunications signals are being received on the down path (base station to mobile station) are marked on the second line 30 of FIG. 2 (GSM Rx). The third line 40 (GPS Rx) shows the moments during which positioning signals are in use.

The description relates to the particular case of a GSM type system. For the up path (FIG. 2, line 20), and for the down path (FIG. 2, line 30), a frame structure is used with successive frames TE1, TE2, TE3, etc. (for transmission) and TR1, TR2, TR3, etc. (for reception), each having eight time slots IT0 to IT7. The recurrence of a particular time slot (e.g. the first slot IT0) in each frame constitutes a physical-channel on which there are transmitted either a single logic channel or a multiplexed plurality of logic channels. There is an offset of three time slots ($\Delta=3$ IT) between the up path and the down path in order to avoid the mobile station transmitting and receiving at the same time.

In the example of FIG. 2, it is assumed that the mobile station in question transmits during the first time slot IT0 (shaded) of each frame TE1, TE2, TE3, etc. of the up path (FIG. 2, line 20), and receives during the first time slot IT0 (shaded) of each frame TR1, TR2, TR3, etc. of the down path (FIG. 2, line 30).

Thus, in this example, the six time slots numbered 1, 2, 4, 5, 6, and 7 in each frame TE1, TE2, TE3, etc. of the up path are referred to as moments of inactivity MI1, MI2, MI3, etc. from the point of view of telecommunications (FIG. 2, line 40), the other two time intervals, numbers 0 and 3, corresponding to GSM transmission and reception, respectively. As shown on line 40, it can be decided, by way of example, to make use of positioning signals that are received during the last four time slots IT4 to IT7 (shaded) in each frame TE1, TE2, TE3, etc. of the up path.

By way of example, the processor means 4 makes use of the positioning signals via appropriate extraction and insertion means 8 for extracting the positioning data contained in the received positioning signals, and then inserting the positioning data, possibly after transforming it, into telecommunications signals that are transmitted by the transmitter 3 to an operating center (e.g. a center for locating stolen mobile stations).

Thus, a geographical position can be computed from the positioning data either:

at the operating center. In which case, the processor means 4 (in the mobile station) do no more than relay the positioning data unaltered; or else by the processor means 4 (of the mobile station) In which case the operating center receives transformed positioning data, corresponding to the result of the computation performed by the processor means 4.

The positioning data (raw or transformed) can be conveyed over the telecommunications network in various ways, for example:

via a control channel, of the stand-alone dedicated type (SDCCH), of the slow associated type (SACCH), of the fast associated type (FACCH), etc., while the mobile station is in communications mode;

via a mobile-originated short message service (SMS-MO) when the mobile station is in standby mode;

in a traffic channel used for setting up a data link between the terminal and the operating center; or using any other channel provided by the system and suitable for conveying data (circuit mode, emulated packet mode, or otherwise).

What is claimed is:

1. A mobile station of a digital cellular communications system, the station being of a type comprising:

means for transmitting and receiving telecommunications signals by radio in time division multiple access mode;

means for receiving positioning signals transmitted by a positioning system; and processor means for processing both said telecommunications signals and said positioning signals;

wherein said processor means is continuously connected to said means for transmitting and receiving telecommunications signals and to said means for receiving positioning signals, said processor means extracting positioning data from said positioning signals that are received when said telecommunications signals are not being transmitted and are not being received, without switching between said means for transmitting and receiving telecommunications signals and said means for receiving positioning signals, and wherein the telecommunications signals are sent and received during time slots within a telecommunications signaling frame, and the positioning signals used are those received during the telecommunications signaling frame but outside of said time slots.

2. A mobile station of a digital cellular communications system, the station being of a type comprising:

means for transmitting and receiving telecommunications signals by radio in time division multiple access mode;

means for receiving positioning signals transmitted by a positioning system; and processor means for processing both said telecommunications signals and said positioning signals;

wherein said processor means is continuously connected to said means for transmitting and receiving telecommunications signals and to said means for receiving positioning signals, said processor means extracting positioning data from said positioning signals that are received when said telecommunications signals are not being transmitted and are not being received, without switching between said means for transmitting and receiving telecommunications signals and said means for receiving positioning signals, said telecommunications signals being structured for transmission and for reception in successive frames, each transmission frame and each reception frame including at least one time slot for transmission or for reception of telecommunication signals by said mobile station, wherein the positioning signals used by the processor means are received during unused time slots, said unused time slots corresponding neither to a transmission time slot nor to a reception time slot for telecommunications signals.

3. A mobile station according to claim 1, including single receiver means common both to said telecommunications signals and to said positioning signals.

4. A mobile station according to claim 1, wherein said processor means, inserts said positioning data, optionally after transforming it, into telecommunications signals transmitted by said transmission means to an operating center.

5. A mobile station according to claim 4, wherein said positioning data is transmitted to said operating center via at least one control channel and/or via a short message service and/or via a data service.

6. A mobile station according to claim 1, wherein said positioning system is of a type comprising a constellation of satellites transmitting said positioning signals.

7. A mobile station according to claim 1, wherein said digital cellular communications system belongs to a group comprising GSM type systems and PCN and DECT type systems.

8. A method of receiving positioning signals by a mobile station of a digital cellular communications system, said mobile station being of a type that transmits and receives telecommunications signals in a time division multiple access mode, the method including steps of:

continuously receiving positioning signals;

sending and receiving telecommunications signals during time slots within a telecommunications signaling frame;

extracting positioning data from the positioning signals that are received during the telecommunications signaling frame but outside of said time slots, without any switching between sending and receiving telecommunications signals and receiving positioning signals.

9. A mobile station, of a digital cellular communications system, comprising:

a radio receiver, simultaneously receiving both telecommunications signals and positioning signals, said telecommunications signals being structured for transmission and reception in successive frames, each transmission frame and each reception frame including at least one time slot for transmission or for reception of telecommunication signals by said mobile station;

a radio transmitter, transmitting telecommunications signals; and a baseband processor, continuously connected to said radio receiver and said radio transmitter, and processing both the telecommunications signals and the positioning signals without any switching between telecommunications signals and positioning signals, wherein predetermined time intervals correspond to segments of time assigned to said mobile station for transmission and reception of telecommunications signals, said predetermined time intervals further correspond to said at least one transmission or reception time slot for transmission or for reception of telecommunication signals by said mobile station; and wherein said baseband processor processes telecommunications signals during said predetermined time intervals, and between said predetermined time intervals, said baseband processor processes at least some of the positioning signals received during the successive signaling frames, but between and outside of said predetermined time intervals, extracting positioning data from the positioning signals.

10. A mobile station according to claim 9, wherein said radio receiver is a broadband radio receiver.

11. A mobile station according to claim 9, wherein said radio receiver is a dual frequency receiver.

12. A mobile station according to claim 9, wherein the positioning data extracted from the positioning signals is output by said baseband processor, and in either raw or transformed form, is transmitted by said radio transmitter.

13. A mobile station according to claim 12, wherein said radio transmitter transmits the positioning signals over at least one of a control channel, a mobile-originated short message service, and a traffic channel.

14. A mobile station according to claim 9, wherein the positioning signals received by said radio receiver and processed by said baseband processor are of a type transmitted by a positioning system comprising a constellation of satellites.

15. A mobile station according to claim 9, wherein said digital cellular communications system belongs to the group comprising Global System for Mobile communication (GSM) type systems, Personal Communications Network (PCN) type systems, and Digital European Cordless Telecommunication (DECT) type systems.

16. A mobile station according to claim 1, said telecommunications signals comprising voice communications.

17. A mobile station according to claim 2, said telecommunications signals comprising voice communications.

18. A method of receiving position signals according to claim 8, said telecommunications signals comprising voice communications.

19. A mobile station according to claim 9, said telecommunications signals comprising voice communications.

20. A mobile station according to claim 1, said telecommunications signals comprising data communications.

21. A mobile station according to claim 2, said telecommunications signals comprising data communications.

22. A method of receiving position signals according to claim 8, said telecommunications signals comprising data communications.

23. A mobile station according to claim 9, said telecommunications signals comprising data communications.

* * * * *